(12) United States Patent
Giampavolo et al.

(10) Patent No.: US 9,540,026 B2
(45) Date of Patent: Jan. 10, 2017

(54) INFANT CARRIER HOLDER

(75) Inventors: Paul Giampavolo, Newton, NJ (US); Christopher M. Johnson, Glen Allen, VA (US)

(73) Assignee: Safe-Strap Company, Inc., Wharton, NJ (US)

( * ) Notice: Subject to any disclaimer, the term of this patent is extended or adjusted under 35 U.S.C. 154(b) by 0 days.

(21) Appl. No.: 13/385,608

(22) Filed: May 1, 2012

(65) Prior Publication Data
US 2013/0292979 A1    Nov. 7, 2013

(51) Int. Cl.
*B62B 5/08* (2006.01)
*B62B 3/18* (2006.01)
*B62B 3/14* (2006.01)

(52) U.S. Cl.
CPC ............ *B62B 5/082* (2013.01); *B62B 3/1444* (2013.01); *Y10T 29/49826* (2015.01)

(58) Field of Classification Search
CPC .......... B62B 3/14; B62B 3/144; B62B 3/1444; B62B 3/1452; B60N 2/24; B60N 2/26
USPC ...... 280/33.991-993; 297/256.17; 296/97.21
See application file for complete search history.

(56) References Cited

U.S. PATENT DOCUMENTS

| | | | |
|---|---|---|---|
| 2,662,775 A | | 12/1953 | Goldman |
| 2,891,801 A | * | 6/1959 | Sides ..................... 280/33.993 |
| 3,351,380 A | * | 11/1967 | Sprague ..................... 297/377 |
| 4,403,807 A | * | 9/1983 | Wilkinson et al. ......... 297/188.1 |
| 4,598,945 A | * | 7/1986 | Hopkins ................. 297/256.17 |
| 4,834,404 A | * | 5/1989 | Wood ..................... 280/33.993 |
| 4,971,343 A | * | 11/1990 | Wood ..................... 280/33.993 |
| 5,096,260 A | | 3/1992 | Hagerstrom |
| 5,277,473 A | * | 1/1994 | Kelly et al. ................. 297/250.1 |
| 5,385,387 A | | 1/1995 | Kain |
| 5,478,135 A | | 12/1995 | Kain |

(Continued)

FOREIGN PATENT DOCUMENTS

DE     29609208     9/1996
DE    296 15 793    11/1996
(Continued)

OTHER PUBLICATIONS

Machine translation of description portion of WO 97/45312, translation provided by http://translationportal.epo.org/emtp/translate/?ACTION=description-retrieval&COUNTRY=WO&ENGINE=google&FORMAT=docdb&KIND=A1&LOCALE=en_EP&NUMBER=9745312&OPS=ops.epo.org/3.1&SRCLANG=de&TRGLANG=en.*

(Continued)

*Primary Examiner* — J. Allen Shriver, II
*Assistant Examiner* — Travis Coolman
(74) *Attorney, Agent, or Firm* — West Hill Technology Counsel, Inc.

(57) ABSTRACT

An infant carrier holder has a floor with a ramp and sidewalls and is mounted to a shopping cart. The ramp and sidewalls can contribute to stably supporting an infant carrier. The holder serves as a mechanical interface between an infant carrier, which can be received in the holder, and the shopping cart. The holder can be concavely shaped to assist in shopping cart nesting in addition to supporting a received infant carrier at a desired angle. The holder can be adjustably mounted to a gate or a basket of the shopping cart and may/may not interfere with nesting operations. The holder permits an infant carrier to be supported on a shopping cart without using a significant amount of shopping cart space or interfering with nesting operations.

13 Claims, 12 Drawing Sheets

(56) References Cited

U.S. PATENT DOCUMENTS

| | | | |
|---|---|---|---|
| D373,028 S | 8/1996 | Kain | |
| D376,919 S | 12/1996 | Sedlack | |
| D399,659 S * | 10/1998 | Reiland et al. | D6/333 |
| D404,880 S | 1/1999 | Chipperfield | |
| D417,568 S | 12/1999 | Pike | |
| D424,311 S | 5/2000 | Geis et al. | |
| D438,716 S | 3/2001 | Longenecker | |
| 6,464,238 B2 * | 10/2002 | Reiland et al. | 280/33.993 |
| 6,554,358 B2 | 4/2003 | Kain | |
| 6,575,480 B2 | 6/2003 | McKelvey | |
| 6,817,665 B2 * | 11/2004 | Pacella et al. | 297/250.1 |
| D555,402 S | 11/2007 | Hou et al. | |
| 7,467,825 B2 * | 12/2008 | Jane Santamaria | 297/253 |
| 7,597,396 B2 | 10/2009 | Longenecker et al. | |
| D648,501 S | 11/2011 | Giampavolo et al. | |
| 8,056,975 B2 * | 11/2011 | Longenecker et al. | 297/253 |
| D650,597 S | 12/2011 | Lehman | |
| 8,235,400 B2 | 8/2012 | Gibson | |
| D683,142 S | 5/2013 | Goldberg | |
| D687,231 S | 8/2013 | Gillett et al. | |
| 8,528,916 B2 | 9/2013 | Giampavolo et al. | |
| 8,556,344 B2 * | 10/2013 | Williams et al. | 297/256.13 |
| 8,567,862 B2 * | 10/2013 | Williams et al. | 297/188.13 |
| D692,678 S | 11/2013 | Williams et al. | |
| 8,585,143 B2 | 11/2013 | Xiao | |
| 8,632,080 B2 | 1/2014 | Russell et al. | |
| D698,558 S | 2/2014 | Williams | |
| 2001/0048235 A1 * | 12/2001 | Hartranft | 297/219.12 |
| 2005/0264062 A1 | 12/2005 | Longenecker et al. | |
| 2011/0115176 A1 | 5/2011 | Giampavolo et al. | |
| 2012/0261961 A1 * | 10/2012 | Heisey et al. | 297/256.16 |
| 2013/0200672 A1 * | 8/2013 | Mo | 297/256.16 |

FOREIGN PATENT DOCUMENTS

| | | |
|---|---|---|
| DE | 296 16 683 | 11/1996 |
| DE | 297 09 944 | 8/1997 |
| DE | 297 09 944 U1 | 8/1997 |
| DE | 19718366 | 12/1997 |
| WO | WO 97/45312 | 12/1997 |
| WO | WO 9745312 A1 * | 12/1997 |

OTHER PUBLICATIONS

PCT International Search Report and Written Opinion, Apr. 30, 2013, consisting of 9 pages.

Photo No. 1—"Shopping Cart Utility Basket", Dec. 21, 2011, England.

Photo No. 2—"Shopping Cart Utility Basket", Dec. 21, 2011, England.

SAFESTRAPCO. (Nov. 26, 2013). Karns Implements Safe-Dock [Video file]. Retrieved from http://www.youtube.com/watch?v=Qpsyj3tfEa8&feature=youtu.be.

Boyd, R. (Jun. 17, 2014). Local grocery store adds safe-dock shopping carts for child safety [Video file]. FOX13 Salt Lake City. Retrieved from http://fox13now.com/2014/06/17/local-grocery-store-adds-safe-dock-shopping-carts-for-child-safety/.

International Preliminary Report on Patentability for International Application No. PCT/US2013/038818, dated Nov. 13, 2014, 8 pgs.

Canadian Intellectual Property Office (CIPO) 1st Office Action for Application No. 2,871,646 dated Mar. 16, 2015, 3 pgs.

Australian Office Action dated Oct. 1, 2015.

Canadian Intellectual Property Office (CIPO) 3rd Office Action for Application No. 2,871,646 dated Dec. 3, 2015, 5 pgs.

Machine Translation of DE19718366 to LW Composite, Dec. 18, 1997.

European Patent Office (EPO) Supplementary European Search Report for Application No. EP13781259.0 dated Dec. 1, 2015 (2 pages).

European Patent Office (EPO) Supplementary European Search Opinion for Application No. EP13781259.0 dated Dec. 1, 2015 (5 pages).

Canadian Intellectual Property Office (CIPO) Office Action for Application No. 2,871,646 dated Apr. 6, 2016 (4 pages).

* cited by examiner

INFANT CARRIER HOLDER

STATEMENT REGARDING FEDERALLY SPONSORED RESEARCH OR DEVELOPMENT (Not Applicable)

BACKGROUND OF THE INVENTION

The present disclosure relates generally to a support for an infant carrier, and relates more particularly to an infant carrier holder for use with a shopping cart.

Infant carriers are well known and widely used for transporting infants in a variety of circumstances. In the case of transporting an infant in a motor vehicle, infant carrier manufacturers sometimes provide a base that can be securely installed in a rear seating area of the motor vehicle and can accept an infant carrier in a secure engagement. The combination of infant carrier and base can provide a stable and fixed transport platform so that an infant in such a carrier can be securely and safely transported in the motor vehicle. Some infant carriers are configured to be secured in a rear seating area of a motor vehicle without a mating base. Typically, the infant carrier is designed to be easily releasable from the motor vehicle securement to permit ease of manual transport. Some types of infant carriers are also configured to be releasably secured to a stroller, to permit the infant carrier to be transported without necessarily manually carrying the infant carrier.

In each of the configurations where an infant carrier mates to a base or stroller for transport, the mating configuration is typically proprietary to the infant carrier manufacturer. Accordingly, an infant carrier made in accordance with one manufacturer's design does not typically engage with or mate with a transport base or cart that is provided in accordance with another manufacturer's design. As a result, infant carriers tend to be usable with transport mechanisms that are specifically designed for that type of infant carrier, and no others.

A shopper with an infant in an infant carrier is often challenged with regard to transporting the infant, infant carrier and a shopping cart that is intended for transporting goods selected by the shopper in a shopping environment. The infant carrier is not ideally placed in a basket of the shopping cart, since little room is left for selected goods, and the carrier may not be stably secured. If the infant carrier is mated to an associated stroller that is specific to the infant carrier design, the shopping customer is challenged to transport the infant carrier-stroller combination and the shopping cart in a shopping environment.

Alternately, the shopper may opt to manually transport the infant in the infant carrier while pushing the shopping cart, which raises another set of challenges. For example, it may be physically difficult for the shopper to carry the infant carrier throughout the shopping experience. The shopper may set the infant carrier on a floor of the shopping environment while selecting goods, for example, which represents a challenge for protection of the infant from potential dangers such as may be presented from dropped objects, being a tripping hazard, or being hit by shopping carts. In addition, the infant is located near to the potentially unsanitary surface of the shopping environment floor.

Recognizing some of these challenges, some infant carrier manufacturers have produced designs intended to be used with popular shopping cart models that permit the infant carrier to be located on a shopping cart in a somewhat stable arrangement. For example, the infant carrier may be configured to cooperate with the handle, gate or foldout seatback of a shopping cart to obtain a somewhat stable perch for the infant carrier. This approach to meeting the above-noted challenges of handling an infant carrier in a shopping environment has several drawbacks. For example, the infant carrier tends to be mounted on the shopping cart at a fairly high location relative to the shopping cart center of gravity, potentially increasing the tip-over risk of the infant carrier or the shopping cart in combination with the infant carrier. In addition, the infant carrier configuration tends to be fairly specific to the manufacturer, as noted above, so that the infant carrier is not usable with all varieties of shopping carts, which tend to vary significantly among retail establishments. Accordingly, the customer with an infant in an infant carrier faces a number of challenges in shopping environments in general.

BRIEF SUMMARY OF THE INVENTION

In accordance with the present disclosure, there is provided an infant carrier holder for use with a shopping cart. The infant carrier holder accommodates a wide variety of infant carriers in a stable arrangement on a wide variety of shopping carts. The infant carrier holder can be mounted to a variety of shopping carts that may have significantly different configurations.

According to an aspect of the present disclosure, the infant carrier holder acts as a mechanical interface between an infant carrier and a shopping cart. The infant carrier holder can be stably secured to a majority of various shopping cart designs, and can accommodate and stably support a majority of infant carrier designs.

According to an aspect of the present disclosure, the infant carrier holder is configured to be nestable, in that the infant carrier holder can receive at least a portion of another infant carrier holder, especially when the infant carrier holder is mounted on a nestable shopping cart. In addition, the infant carrier holder is stackable, e.g., for storage and shipping, so that a number of infant carrier holders can be maintained in a smaller amount of space.

According to another aspect, the infant carrier holder includes one or more projections that protrude from an upwardly facing surface. The projection(s) is (are) configured and arranged to provide support for an infant carrier placed atop the infant carrier holder such that the infant carrier is generally stabilized when placed atop the infant carrier holder in cooperation with the projection(s).

According to another aspect, the infant carrier includes one or more upright walls located at a lateral edge of the infant carrier holder. Each wall can contribute to stabilizing the infant carrier in the infant carrier holder, such as by preventing translational lateral movement of the infant carrier. The one or more upright walls can also contribute to locating the infant carrier in relation to the projection(s) discussed above, so that the stabilizing relationship obtained between the infant carrier and the projection(s) can be established and maintained.

According to another aspect, the present disclosure provides a mechanism for contributing to securing the infant carrier to the infant carrier holder. For example, a strap affixed to the infant carrier holder can be secured around the infant carrier to maintain the infant carrier in the infant carrier holder. The strap may be configured to have a buckle that can be readily clasped and unclasped to secure and free the infant carrier, respectively. The strap may be adjustable to permit a custom fit to the size and shape of the infant carrier. Any other types of securing mechanisms may readily be used with the infant carrier holder, including such mechanisms as harnesses, releasable clamps, elastic cords or other components, retractable stay-bars, and any other mechanisms that can contribute to securing the infant carrier to the infant carrier holder.

According to another aspect, the mounting mechanism for the infant carrier holder is adjustable, to permit a secure attachment to a variety of shopping carts. According to one aspect, the infant carrier holder can be attached to a shopping cart gate, to permit the infant carrier holder to swing with the shopping cart gate, such as upon the shopping cart being nested with another shopping cart, causing the gate to be rotated upward. According to another aspect, the infant carrier holder can be attached to the frame and handle of the shopping cart, to permit free movement of a gate and foldout seat, so that the infant carrier holder does not obstruct the nesting action of the shopping cart.

According to another aspect, the infant carrier holder may be located on the frame of the shopping cart within or above a region of the shopping cart basket to avoid interference with the operation of nesting related components of the shopping cart. The infant carrier holder is provided with an attachment mechanism to permit mounting to various locations on a shopping cart, including locations that interfere or do not interfere with the nesting operation of the shopping cart. In some instances, some mounting locations for the infant carrier holder may be preferred for stability or ease of use, even though mounting the infant carrier in those locations may cause the shopping cart to be non-nestable with other like shopping carts.

According to another aspect, the infant carrier holder is composed of material that resists influences of harsh environments, including extremes of heat and cold and precipitation. The infant carrier holder may be configured to include one or more openings to permit water drainage to avoid pooling caused by precipitation, for example. The material of the infant carrier holder may be chosen to be able to resist impacts, such as may occur from contact with other carts or infant carrier holders, as well as other objects typical of a typical shopping environment.

BRIEF DESCRIPTION OF THE SEVERAL VIEWS OF THE DRAWINGS

Embodiments of the present disclosure are described in greater detail below, with reference to the accompanying drawings, in which.

DETAILED DESCRIPTION OF THE INVENTION

The present disclosure provides an infant carrier holder for use with a shopping cart that can act as a mechanical interface between various models of shopping carts and various models of infant carriers. The infant carrier holder can be adapted for use with a variety of shopping cart models, and can contribute to securely accommodating infant carriers of various models and types.

Figure 1:
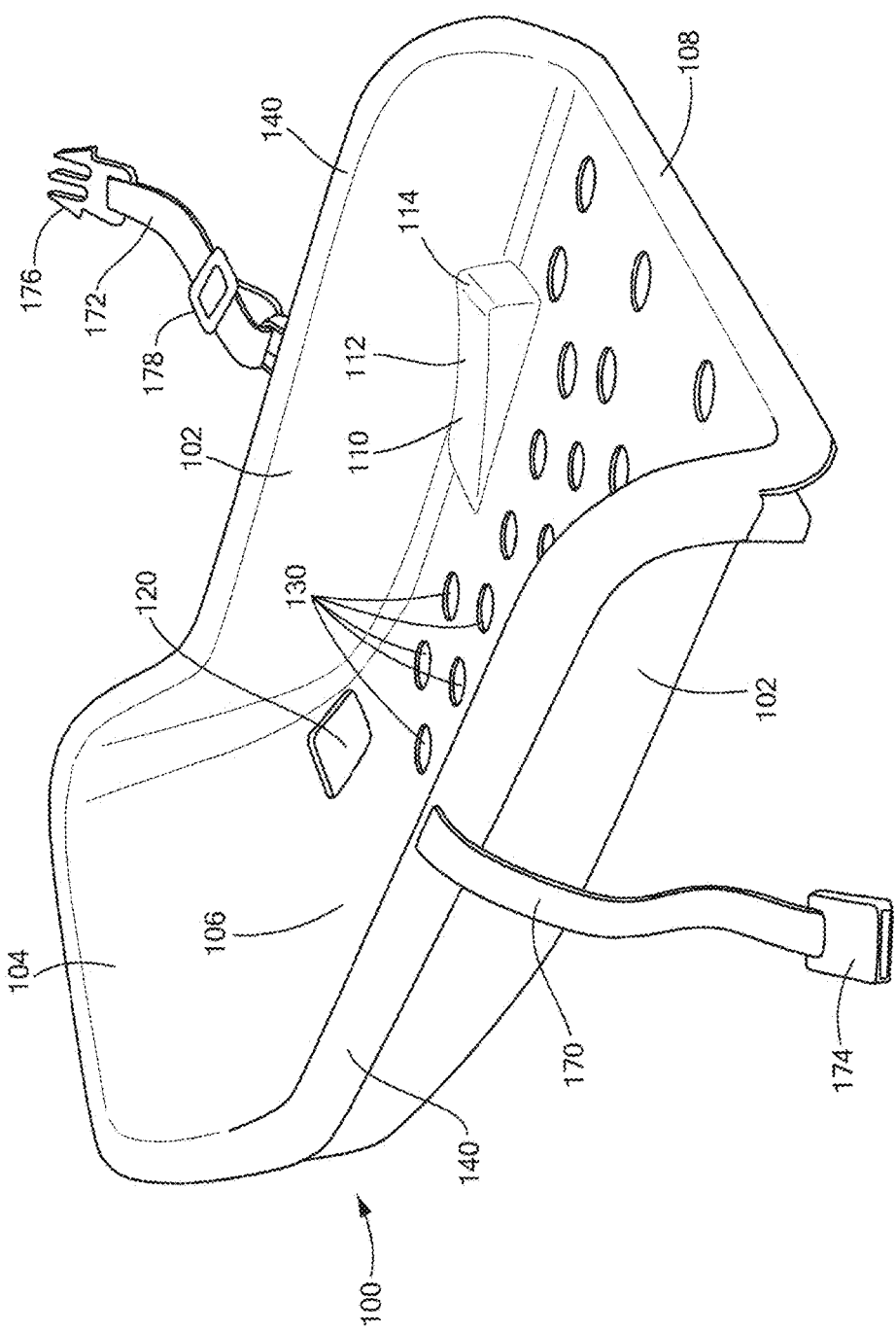
FIG. 1 is a perspective view of the infant carrier holder in accordance with an exemplary embodiment of the present disclosure.
Figure 2:
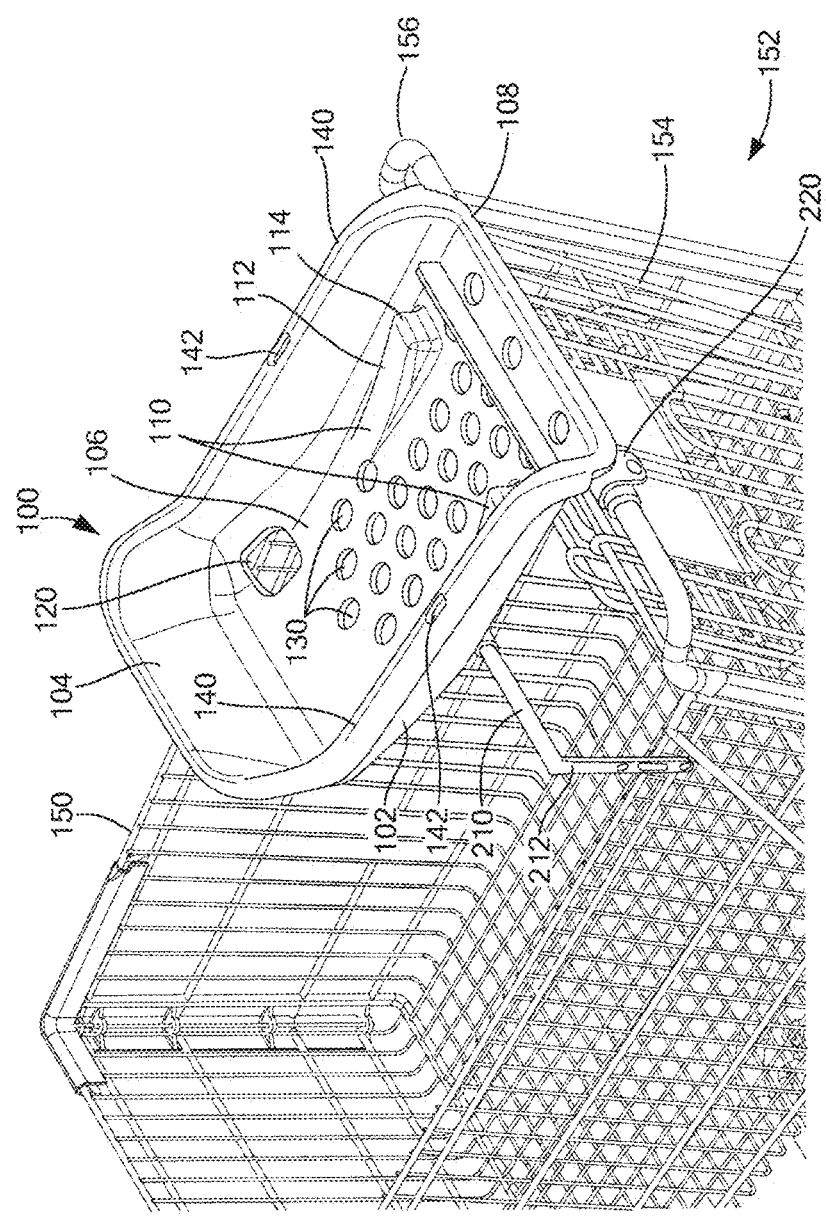
FIG. 2 is a perspective view of the infant carrier holder as used with a shopping cart in accordance with an exemplary embodiment of the present disclosure.

Referring now to FIGS. 1 and 2, an exemplary embodiment of an infant carrier holder 100, referred to herein as holder 100, is illustrated. Holder 100 has a generally concave shape and is sized to receive any of various infant carriers (not shown). Holder 100 includes opposing sidewalls 102 and a rear wall 104. Sidewalls 102 and rear wall 104 are connected together to form a concave shape in conjunction with an interior lower surface or floor 106. The concave shape of holder 100 provides lateral stability and support for an infant carrier placed atop holder 100 and generally in contact with and supported by floor 106.

Holder 100 includes ramps 110 that are situated near side walls 102 and toward a front edge 108 of holder 100. Ramps 110 are arranged to have an arcuate upper surface 112 that extends in a curved shape from a high point 114 to be coextensive with floor 106. The curved shape of surface 112 cooperates with a curved lower surface of an infant carrier to seat the infant carrier in a stable position with respect to holder 100. In general, infant carriers have curved lower surfaces that can generally cooperate with surface 112 of ramp 110 to contribute to preventing the infant carrier from sliding or changing position within holder 100. The curvature of the lower surface of infant carriers is typically an arc, which may be a circular arc, that varies between model types and manufacturers, but generally has a length within a range of from about 15° to about 25°. The radius of curvature of the arc can be calculated according to Equation 1

$$r = \frac{W^2}{8H} + \frac{H}{2} \qquad \text{(Equation 1)}$$

where r is the radius of curvature, W is the width of the arc, and H is the height of the arc.

The radius of curvature of surface 112 can be in the range of from about 50 to about 200 inches, as calculated using Equation 1. The length of the arc described by surface 112 can be determined from the angular range (in radians) of from about 15° to about 25° times the radius. The shape and size of ramp 110 generally acts to prevent infant carriers placed within holder 100 from rocking or sliding by cooperating with the lower curved surface of the infant carrier. In general, ramps 110 and curved surfaces 112 provide a stabilizing support for infant carriers placed atop and/or in holder 100 to permit various models of infant carriers to be uniformly supported and stabilized on holder 100.

Figure 4:
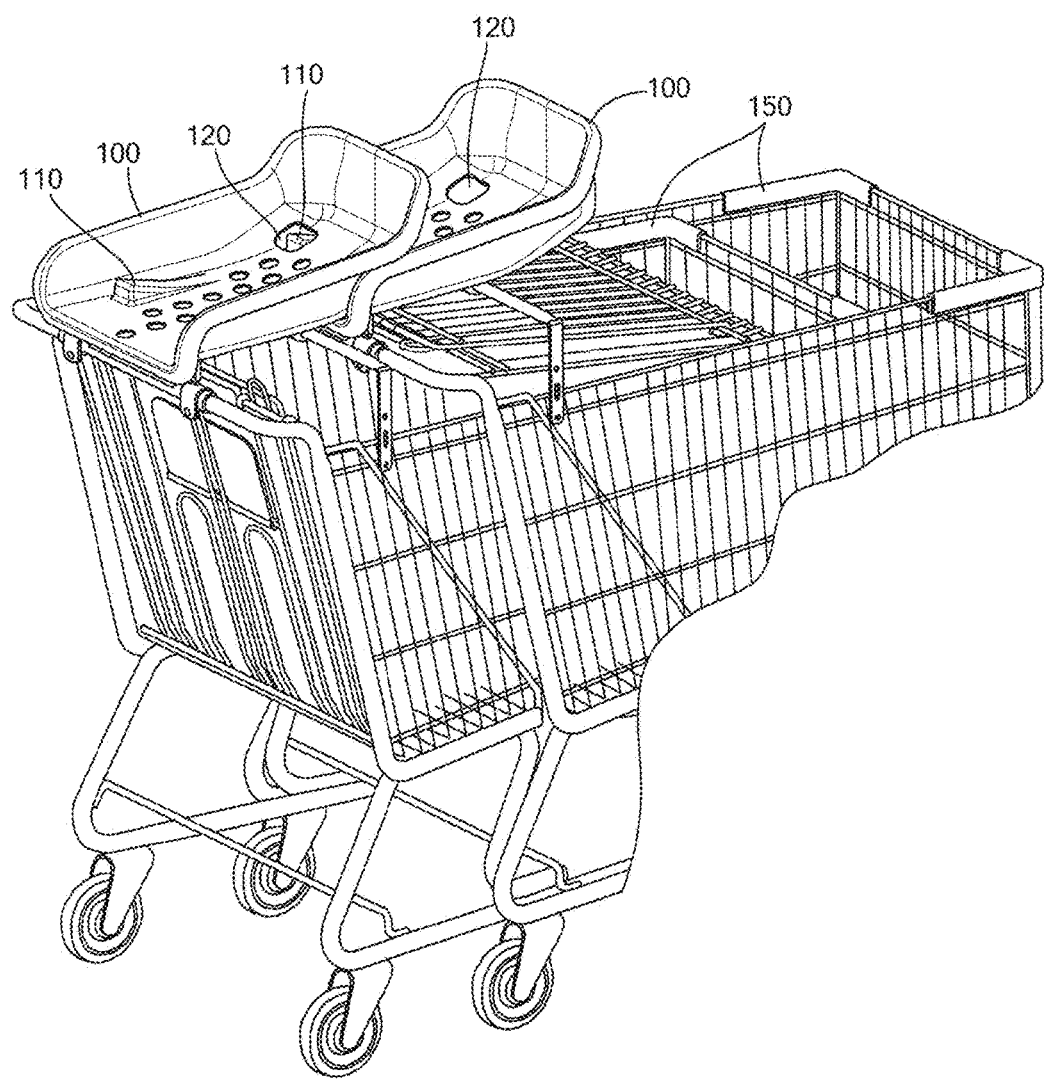
FIG. 4 is a perspective view of the infant carrier holder as used with each of two nested shopping carts in accordance with an exemplary embodiment of the present disclosure.

Holder 100 is intended to be usable with a shopping cart 150 (FIG. 2) that nests with other, like shopping carts 150. Two shopping carts 150, as shown in FIG. 4, can generally be nested by urging a front of one shopping cart 150 through a gate opening 152 of another shopping cart 150, tending to urge a gate 154 of the other shopping cart 150 upward in a pivoting motion. The nested shopping carts 150 tend to take up less space, and permit a number of nested shopping carts 150 to be handled all together. Holder 100 facilitates use on nestable shopping cart 150 with the provision of openings, such as opening 120, for example, that are located and sized to accommodate ramps 110 of another holder 100 when holders 100 are installed on sequential, nested shopping carts. In FIG. 4, nested shopping carts 150 are shown with nested holders 100 that include openings 120 that can accommodate ramps 110 when holders 100 are nested due to being mounted on nested shopping carts 150.

Referring now to FIGS. 1 and 2, holder 100 is shown in an exemplary embodiment as having a number of through openings 130 arranged in floor 106. Openings 130 permit fluids that might be collected by holder 100 to drain off of floor 106 through openings 130. For example, if holder 100 is exposed to rain in an outdoor environment, holder 100 does not collect the precipitation, instead permitting the rainwater to drain through openings 130. Similarly, if holder 100 is exposed to a spill of liquid in a shopping environment, for example, the liquid can drain through openings 130 to avoid collection of liquid by holder 100. The provision of openings 130 also reduces the amount of material used to construct holder 100. It should be understood that openings 130 are not required, and can be omitted, or provided in any useful pattern to obtain the above-noted benefits.

Holder 100 also includes rails 140 located on upper edges of sidewalls 102. Rails 140 are formed as outwardly curved portions of the upper edge of sidewalls 102. Rails 140 provide a reinforcing structure for sidewalls 102, as well as providing a location for attachment of a strap portion 170, 172 that can be used to secure the infant carrier to holder 100. For example, rails 140 may include a through opening 142, which can be used to secure an end of strap portions 170, 172 to holder 100. Rails 140 also are designed to permit a certain amount of overlap with rails 140 of another nested holder 100 when two shopping carts 150 with holders 100 are nested together, as illustrated in FIG. 4. Rails 140 thus have an upward slant from a rear to a front of shopping cart 150 to which holder 100 is mounted. The upward slant of rails 140 thus accommodates rails 140 of another nested holder 100 when holders 100 are mounted to sequentially nested shopping carts 150.

According to an exemplary embodiment of the present disclosure, holder 100 includes straps 170, 172 that are attached at one end to side rails 140, with another end attached to a respective buckle segment 174, 176. Straps 170, 172 can be coupled together around an infant carrier using buckle segments 174, 176 to secure the infant carrier in holder 100. Strap 172 includes an adjustment device 178 that can be used to adjust a length of strap 172. Although not shown in the drawings, strap 170 may alternately or additionally include an adjustment device 178 to permit strap 170 to be adjustable. The overall length of the combination of straps 170, 172 when coupled together with buckle segments 174, 176 can be adjusted using adjustment device 178 to provide a snug and secure arrangement for retaining the infant carrier in holder 100. For example, strap 172 can be adjusted using adjustment device 178 to lengthen a distance between side rail 140 and buckle segment 176 prior to coupling buckle segments 174, 176 around an infant carrier placed in holder 100. Such an adjustment permits buckle segments 174, 176 to be coupled without significant tension being placed on straps 170, 172. Strap 172 can then be adjusted to tighten straps 170, 172 around the infant carrier using adjustment device 178 to secure the infant carrier in holder 100. It should be apparent that other types of adjustment devices or securing mechanisms may be used together with, or in place of straps 170, 172, adjustment device 178 and/or buckle segments 174, 176. Such examples may include harnesses, releasable clamps, elastic cords or other elastic components, retractable stay bars, and any other mechanism that can contribute to securing the infant carrier in holder 100.

Figure 3:
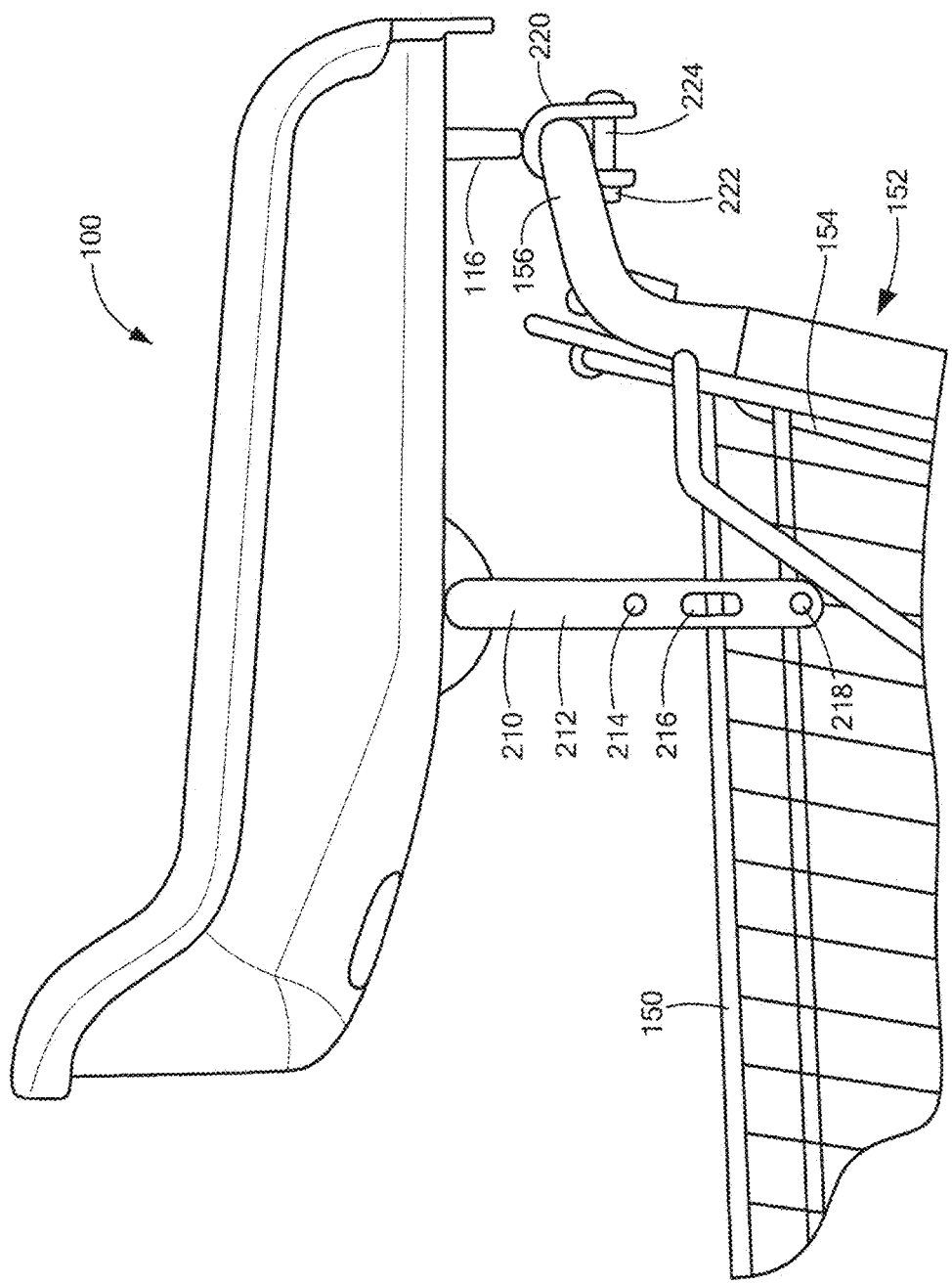
FIG. 3 is a side elevation view of the infant carrier holder as used with a shopping cart in accordance with an exemplary embodiment of the present disclosure.

Referring now to FIGS. 2 and 3, holder 100 is mounted to shopping cart 150 with brackets 210, 220. Bracket 210 includes vertical members 212 with openings 214, 216 and 218, which can be used to secure vertical member 212 to shopping cart 150. The placement of openings 214, 216 and 218 on vertical member 212 allow for adjustment in the attachment of bracket 210 to shopping cart 150. Opening 216 is a slotted opening, which permits additional flexibility in securing vertical member 212 to shopping cart 150. Shopping carts 150 can have varying tolerances in their construction among carts of the same model that can be accommodated by the variable securing location permitted by opening 216 being slotted in shape. In addition, different model carts may be used in the same retail establishment, which differences can be accommodated with the variety of securing locations provided by openings 214, 216 and 218. For example, either opening 214 or 218 may be located and secured to a particular point on a sidewall of a cart such as shopping cart 150 or a different model cart. Opening 216 may then be used to secure bracket 210 to the cart at a variable securing location by being slotted. By providing openings 214, 216 and 218 in this configuration, a number of shopping cart configurations, including that of shopping cart 150, can be accommodated for mounting holder 100.

The locations of openings 214, 216 and 218 permit brackets 210 to be secured in a position on shopping cart 150 to provide a certain height for holder 100 above an edge of the basket of shopping cart 150. The height of holder 100 above the basket edge of shopping cart 150 provides clearance for gate 154 to pivot upward when another shopping cart 150 is urged into gate opening 152 of shopping cart 150. In addition, the height of holder 100 above the basket edge of shopping cart 150 accommodates nesting of another holder 100, as illustrated in FIG. 4. Bracket 210 is located along a length of holder 100 to avoid interference with a nested holder 100 from another nested shopping cart 150, while providing suitable support for an infant carrier placed atop and/or within holder 100. The location at which bracket 210 is connected to holder 100 can be provided as a pivoting connection to permit holder 100 to be set as various heights above the basket edge of shopping cart 150 using various vertical locations for vertical member 212 being secured to a sidewall of shopping cart 150.

Bracket 220 secures holder 100 to shopping cart 150 at a handle 156, using an attachment extension 116 that extends vertically from an underside of holder 100 in a mounted position. According to an exemplary embodiment, extension 116 is molded as part of holder 100. It should be understood that extension 116, or like attachment structures can be optionally omitted or formed as part of a bracket and secured to holder 100 using any type of common securing mechanism, including screws, rivets, bolts and the like. By providing extension 116 as a molded portion of holder 100, an attachment of holder 100 to handle 156 avoids interruption in floor 106 of holder 100, for example. Extension 116 can include openings (not shown) or receptacles (not shown) for screws, rivets, bolts and the like to permit bracket 220 to be securely attached to extension 116. In accordance with an exemplary embodiment, bracket 220 is a U-bolt, shaped as a "U" and secured around handle 156 with a nut 222 and a bolt 224. Extension 116 attached to bracket 220 elevates a base of holder 100 above handle 156 to permit a shopping cart user to access handle 156 under holder 100 to be able to push a shopping cart 150.

By providing brackets 210, 220, holder 100 is elevated above shopping cart 150 in a location to permit holder 100 to be nested with other holders 100 when like shopping carts 150 are nested. Brackets 210, 220 also locate holder 100 to avoid interference with a nesting operation of shopping carts 150, but providing a clearance for gate 154 to pivot upward when shopping carts 150 are nested in addition to avoiding interference with a handle 156 of a nested shopping cart, as illustrated in FIG. 4. It should be understood that carrier 100 can be mounted in other locations on shopping cart 150, using brackets 210, 220 or other attachment configurations. In some locations, holder 100 may interfere with shopping cart 150 being urged into a nesting configuration with another shopping cart 150, or may interfere with another shopping cart 150 being urged into a nesting configuration with shopping cart 150 having holder 100. For example, holder 100 may be mounted within a basket of shopping cart 150 to lower a height of an infant carrier placed on or within holder 100. Accordingly, a shopping cart to which holder 100 is mounted need not be nestable with other like shopping carts, but can be treated separately from other carts by a manager of a retail establishment as providing the feature of an infant carrier holder.

Figure 5:
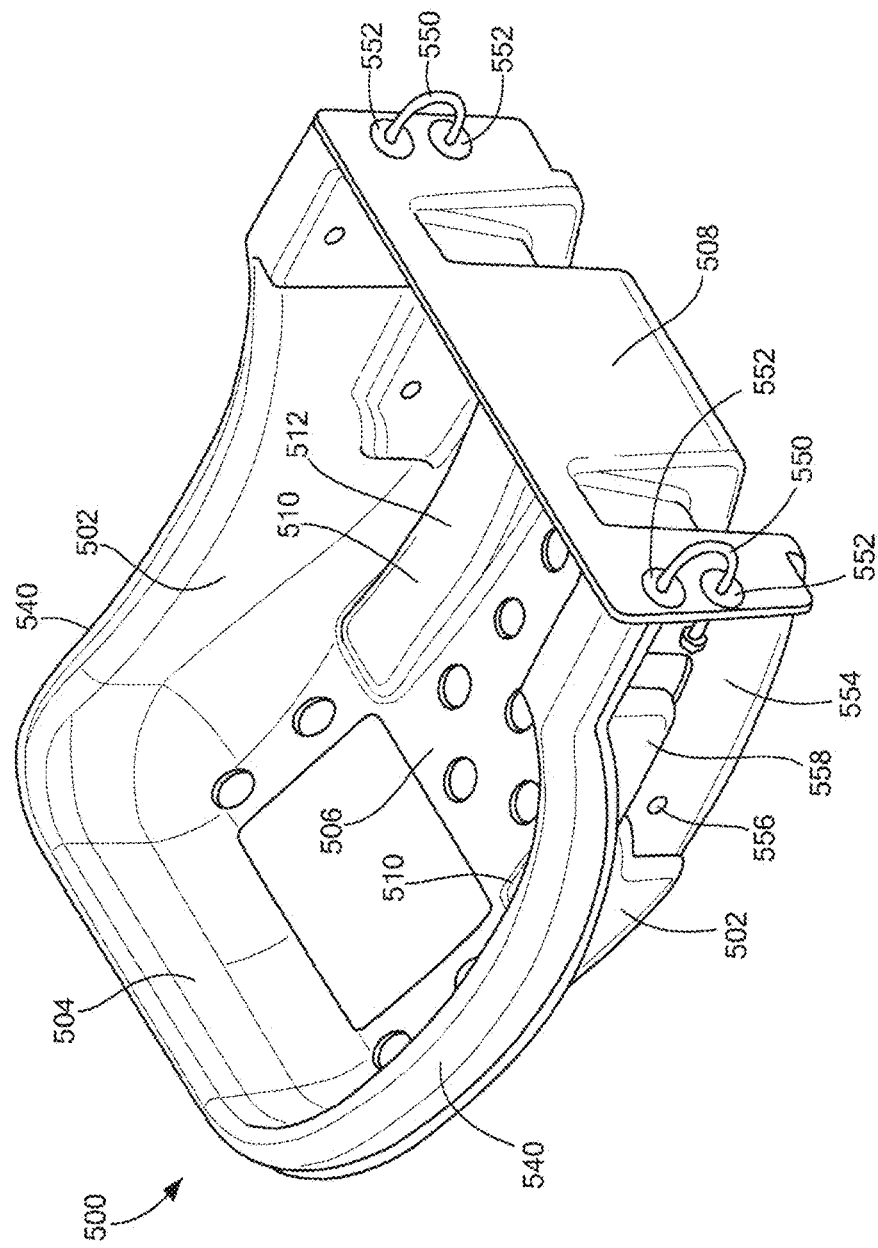
FIG. 5 is a perspective view of the infant carrier holder in accordance with an exemplary embodiment of the present disclosure.

Referring now to FIG. 5, an exemplary embodiment of an infant carrier holder 500, referred to herein as holder 500, is illustrated. Holder 500 has a generally concave shape and is sized to receive any of various infant carriers (not shown). Holder 500 includes opposing sidewalls 502 and a rear wall 504. Sidewalls 502 and rear wall 504 are connected together to form a concave shape in conjunction with an interior lower surface or floor 506. The concave shape of holder 500 provides lateral stability and support for an infant carrier placed atop and/or in holder 500 and generally in contact with and supported by floor 506.

Holder 500 includes ramps 510 that are situated near side walls 502 and toward a front edge 508 of holder 500. Ramps 510 are arranged to have an arcuate upper surface 512 that is raised above floor 506 and curves from a high point 514 to a low point 516. The curved shape of surface 512 cooperates with a curved lower surface of an infant carrier to seat the infant carrier in a stable position with respect to holder 500. In general, as described above, infant carriers have curved lower surfaces that can generally cooperate with surface 512 of ramp 510 to contribute to preventing the infant carrier from sliding or changing position on and/or within holder 500.

The radius of curvature of surface 512 can be in the range of from about 50 to about 200 inches, as calculated using Equation 1. The length of the arc described by surface 512 can be determined from the angular range (in radians) of from about 15° to about 25° times the radius. The shape and size of ramp 510 generally acts to prevent infant carriers placed within holder 500 from rocking or sliding by cooperating with the lower curved surface of the infant carrier. In general, ramps 510 and curved surfaces 512 provide a stabilizing support for infant carriers placed atop and/or in holder 500 to permit various models of infant carriers to be uniformly supported and stabilized on holder 500.

Figure 9:
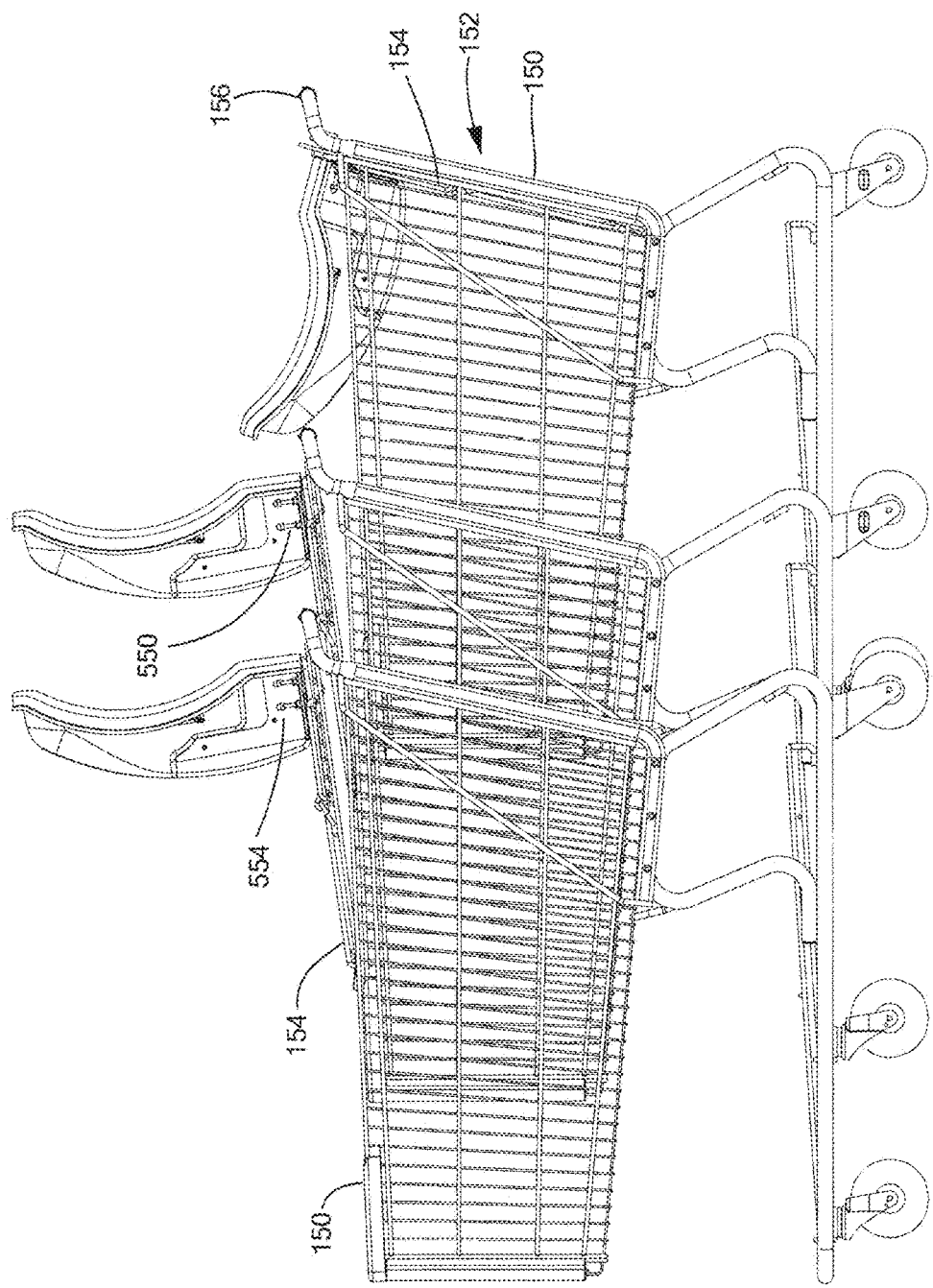
FIG. 9 is a perspective view of the infant carrier holder as used with each of three nested shopping carts in accordance with an exemplary embodiment of the present disclosure.

Referring for a moment to FIG. 9, holder 500 is intended to be usable with shopping cart 150 that nests with other, like shopping carts 150. Shopping carts 150 can generally be nested by urging a front of one shopping cart 150 through a gate opening 152 of another shopping cart 150, tending to urge a gate 154 of the other shopping cart 150 upward in a pivoting motion. The nested shopping carts 150 tend to take up less space, and permit a number of nested shopping carts 150 to be handled all together. Holder 500 facilitates use on nestable shopping cart 150 by being mounted to gate 154, to permit holder 500 to pivot upward with gate 154 in a nesting action.

Figure 6:
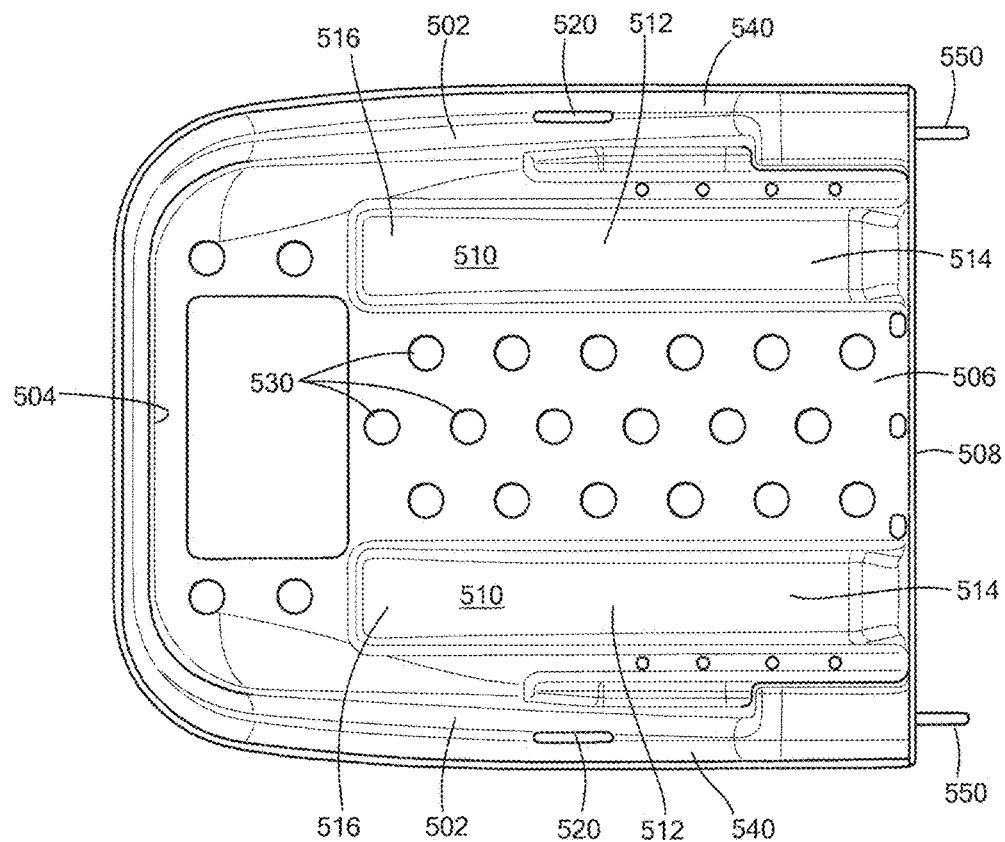
FIG. 6 is a side elevation view of the infant carrier holder in accordance with an exemplary embodiment of the present disclosure.
Figure 7:
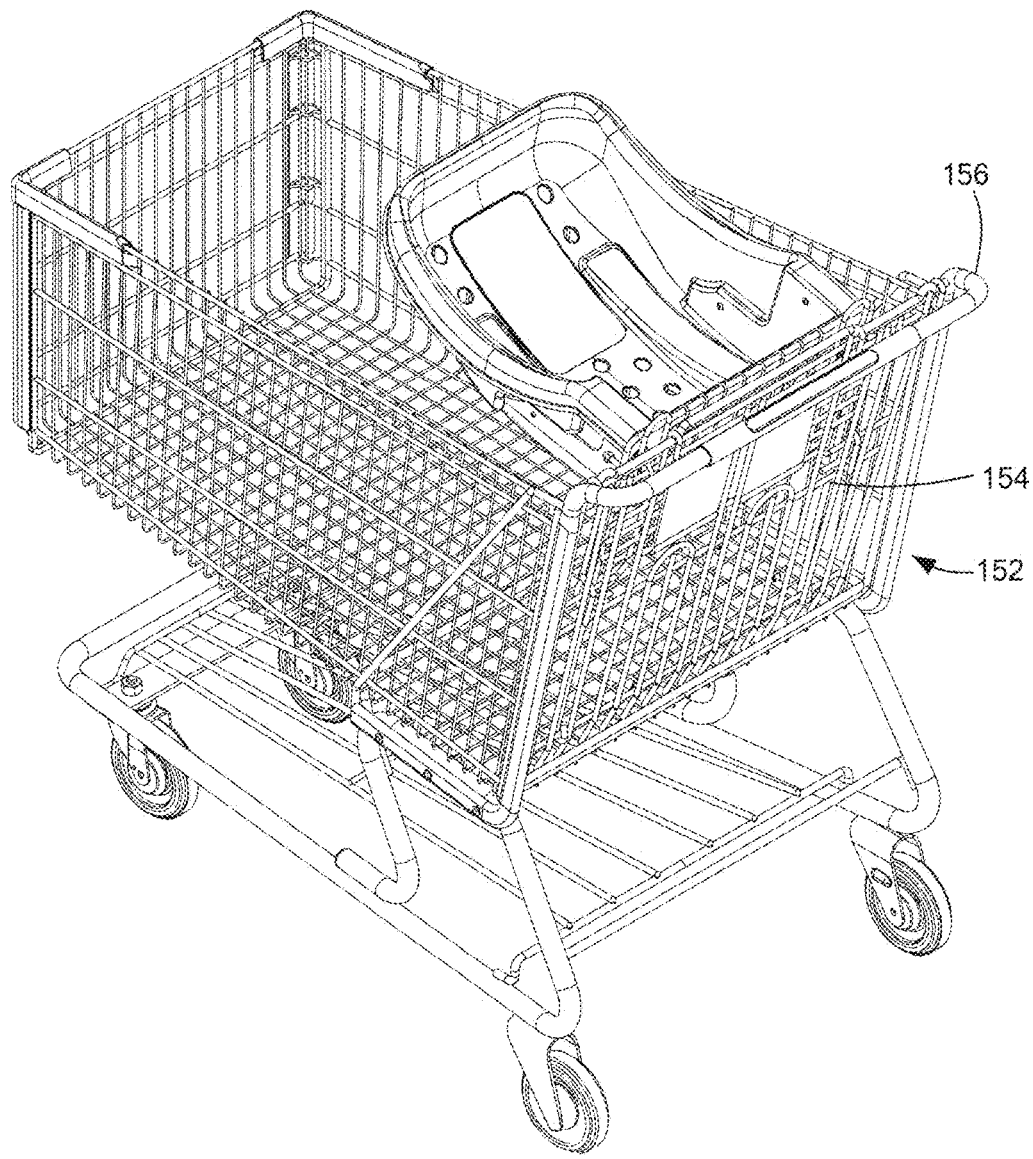
FIG. 7 is a perspective view of the infant carrier holder as used with a shopping cart in accordance with an exemplary embodiment of the present disclosure.
Figure 8:
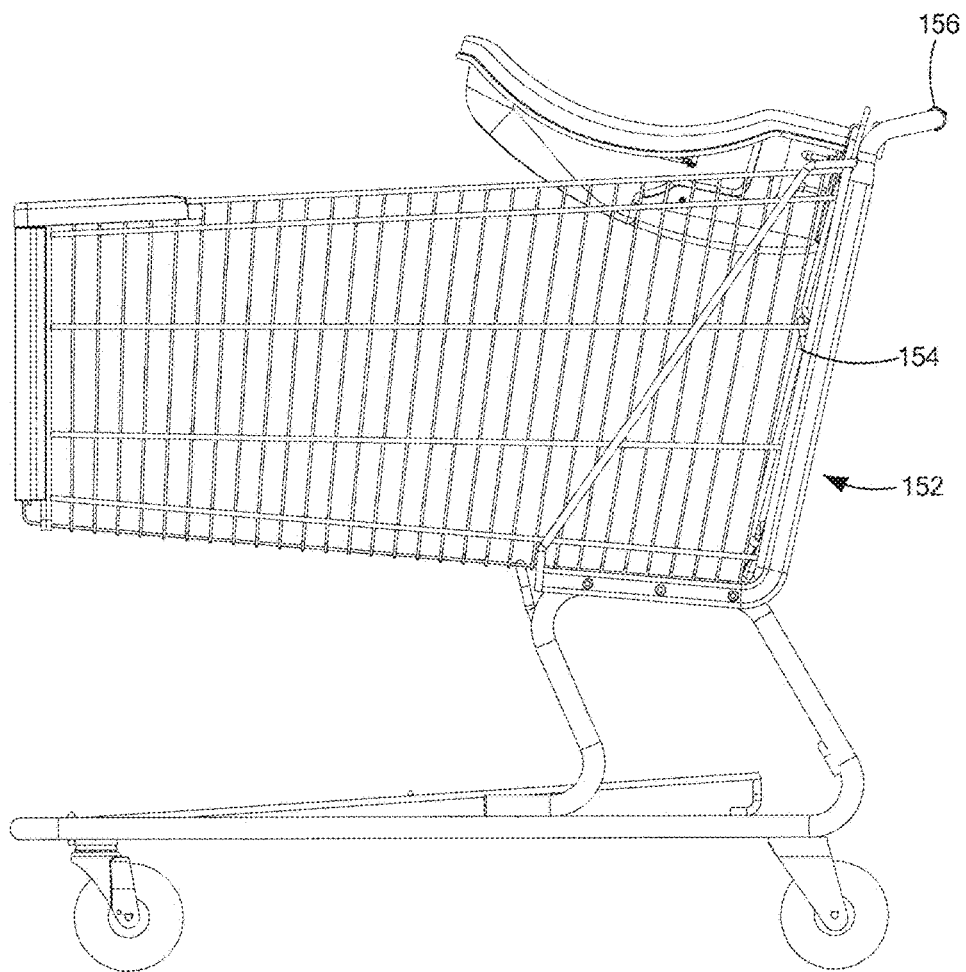
FIG. 8 is a side elevation view of the infant carrier holder as used with a shopping cart in accordance with an exemplary embodiment of the present disclosure.

Referring now to FIGS. 5 and 6, holder 500 is shown in an exemplary embodiment as having a number of through openings 530 arranged in floor 506. Openings 530 permit fluids that might be collected by holder 500 to drain off of floor 506 through openings 530. For example, if holder 500 is exposed to rain in an outdoor environment, holder 500 does not collect the precipitation, instead permitting the rainwater to drain through openings 530. Similarly, if holder 500 is exposed to a spill of liquid in a shopping environment, for example, the liquid can drain through openings 530 to avoid collection of liquid by holder 500. The provision of openings 530 also reduces the amount of material used to construct holder 500. It should be understood that openings 530 are not required, and can be omitted, or provided in any useful pattern to obtain the above-noted benefits.

Holder 500 also includes rails 540 located on upper edges of sidewalls 502. Rails 540 are formed as outwardly curved portions of the upper edge of sidewalls 502. Rails 540 provide a reinforcing structure for sidewalls 502, as well as providing a location for openings 520 that can serve as points of attachment for straps (not shown) that can form parts of a belt (not shown) that can be used to secure an infant carrier in and/or on holder 500. It should be apparent that other types of adjustable or non-adjustable securing mechanisms may be used on holder 500 to secure an infant carrier in and/or on holder 500. Examples of such mechanisms may include harnesses, releasable clamps, elastic cords or other elastic components, retractable stay bars, and any other mechanism that can contribute to securing the infant carrier in holder 500.

Referring now to FIGS. 5-8, holder 500 is mounted to shopping cart 150 with brackets 550. Front edge 508 of holder 500 includes through openings 552 that can accept mounting brackets to secure holder 500 to shopping cart 150. Bracket 550 includes a U-bolt with threaded ends that are passed through openings 552 and on which nuts are screwed to abut an opposing side of front edge 508 to securely affix a portion of gate 154 within bracket 550. Bracket 550 thus securely fastens front edge 508 of holder 500 to gate 154 of shopping cart 150. Holder 500 may also include plates 554 on either side of holder 500 to provide additional support for mounting and operating holder 500. Plates 554 may be composed of a suitable material that provides rigidity and support to at least certain portions of holder 500. For example, plates 554 may be composed of a metal such as brass alloys, or brass constituents, aluminum, or iron and iron derivatives and metal plated structures. Each of plates 554 can be configured to have a portion that abuts an opposing side of front edge 508 to reinforce support provided by front edge 508 being mounted to gate 154. Each of plates 554 can also have a portion that extends along an exterior portion of sidewalls 502, where plates 554 can be securely fastened at points 556 with fasteners such as nuts and bolts, screws, rivets, or any other type of useful fastener. Plates 554 can be arranged under protrusions 558 to provide additional stability, support and leverage for holder 500 when in use in regular operation, including during nesting actions for shopping cart 150.

Front edge 508 has a generally planar shape, so that a relatively large area of front edge 508 contacts gate 154. This relatively large, planar area included in front edge 508 contributes to stabilizing, supporting and providing leverage to holder 500 when an infant carrier is placed in and/or on holder 500. Likewise, the shape of front edge 508 helps to stabilize, support, and leverage holder 500 when gate 154 is pivoted upward in a nesting action, and when holder 500 is in a generally vertical position as a result of gate 154 being pivoted into a position suitable for nesting shopping carts 150 (FIG. 9).

Brackets 550 and openings 552 permit a certain amount of flexibility in mounting holder 500 to shopping cart 150. For example, openings 552 can be oval in shape, or slotted, to permit brackets 550 to be moved in-plane with the plane of front edge 508. Brackets 550 are configured to mount to horizontal member of gate 154, however other or additional brackets configured to mount to vertical and/or horizontal members of gate 154 can be provided.

In general, holder 500 is mounted to gate 154 with brackets 550 at a selectable height. According to an exemplary embodiment, holder 500 is mounted to gate 154 at a highest extent available for accommodating brackets 550. Mounting holder 500 at such a location accommodates nesting of another holder 500, as illustrated in FIG. 9. In addition, holder 500 being mounted to gate 154 avoids interference with handle 156 to permit a user to easily grasp handle 156 to push shopping cart 150.

Holder 500 is generally concavely curved in shape to obtain several advantages. The generally concave shape of holder 500 provides additional security for an infant carrier place within holder 500, as the infant carrier is generally urged into a stable location by the curved surfaces, including rear wall 504, floor 506, sidewalls 502 and ramps 510. The generally concave shape also contributes to permitting holder 500 to perform a nesting action.

Referring to FIG. 9, an exterior lower edge portion of holder 500 is relatively higher than handle 156, due at least in part to the generally concave shape of holder 500. When shopping cart 150 is urged into another cart in a nesting action, holder 500 can ride over handle 156 to urge gate 154 to pivot upward. Moreover, such positioning permits holder 500 to ride over handle 156 when another cart is nested into shopping cart 150, so that handle 156 does not block holder 500 from pivoting upward with gate 154 during such nesting.

When another cart is nested into shopping cart 150, and gate 154 is pivoted upward, holder 500 moves from riding over handle 156 to an upright position. In moving through these positions in a pivoting motion, holder 500 avoids contact with another holder 500 mounted to another shopping cart 150 into which shopping cart 150 is being nested, as illustrated in FIG. 9. The concave shape of rails 540, for example, provides a clearance for a rear edge and rear wall 504 of holder 500 to pass by during nesting without interference between holders 500.

It should be understood that carrier 500 can be mounted in other locations on shopping cart 150, using brackets 550 or other attachment configurations. In some locations, holder 500 may interfere with shopping cart 150 being urged into a nesting configuration with another shopping cart 150, or may interfere with another shopping cart 150 being urged into a nesting configuration with shopping cart 150 having holder 500. For example, holder 500 may be mounted within a basket of shopping cart 150 to lower a height of an infant carrier placed on or within holder 500. In such a location, holder 500 may be below handle 156 and be blocked from pivoting upward in a nesting action. Holder 500 being located lower in the basket of shopping cart 150 may be free to pivot upward in a nesting action when shopping cart 150 is not nested into another cart, but not when another cart is nested into shopping cart 150. Because shopping cart 150 with holder 500 in a lower position in the basket may respond differently to different nesting actions, it may be treated separately from other carts by a manager of a retail establishment as providing the feature of an infant carrier holder.

Figure 10:
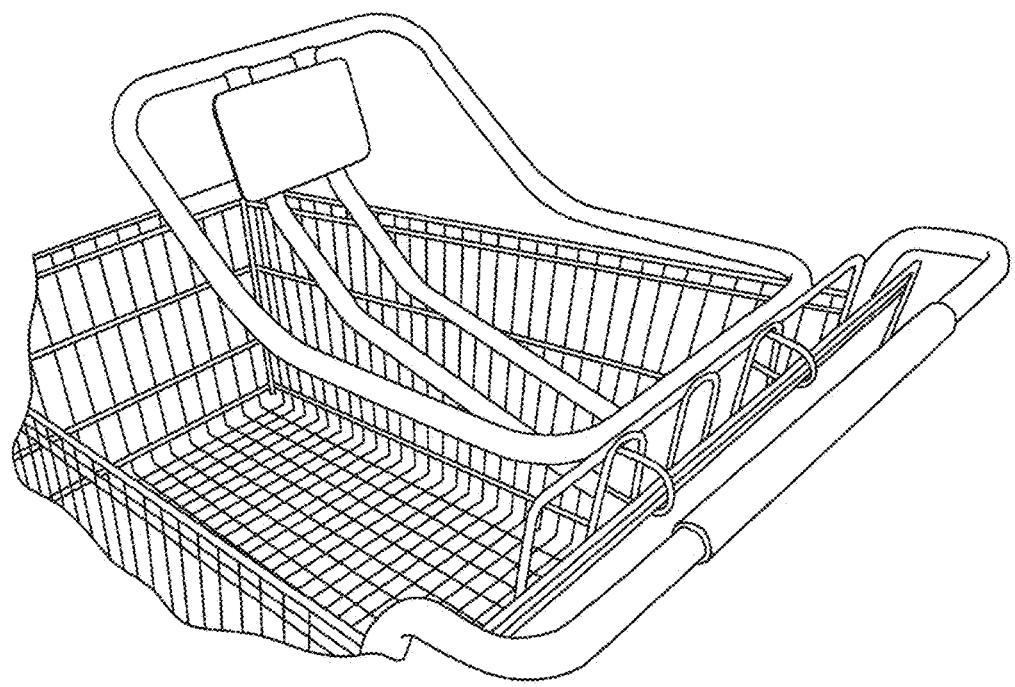
FIGS. 10-12 are perspective views of another exemplary embodiment in accordance with the present disclosure.
Figure 11:
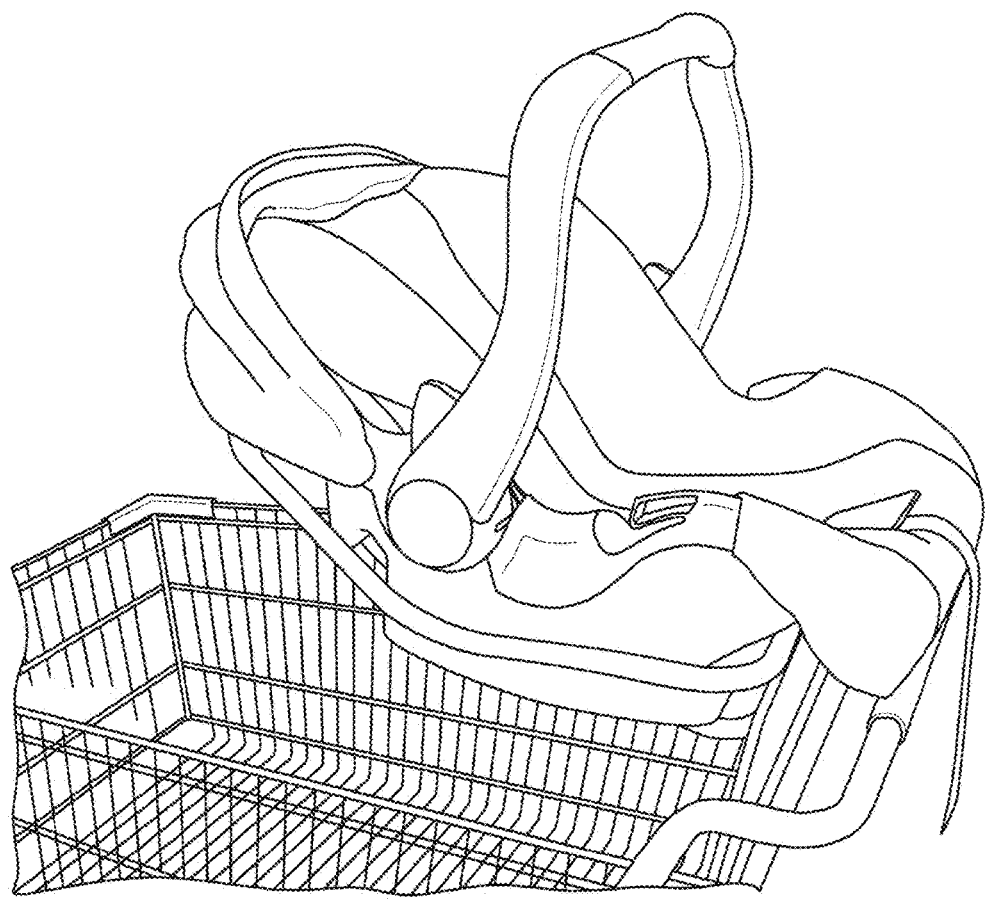
Figure 12:
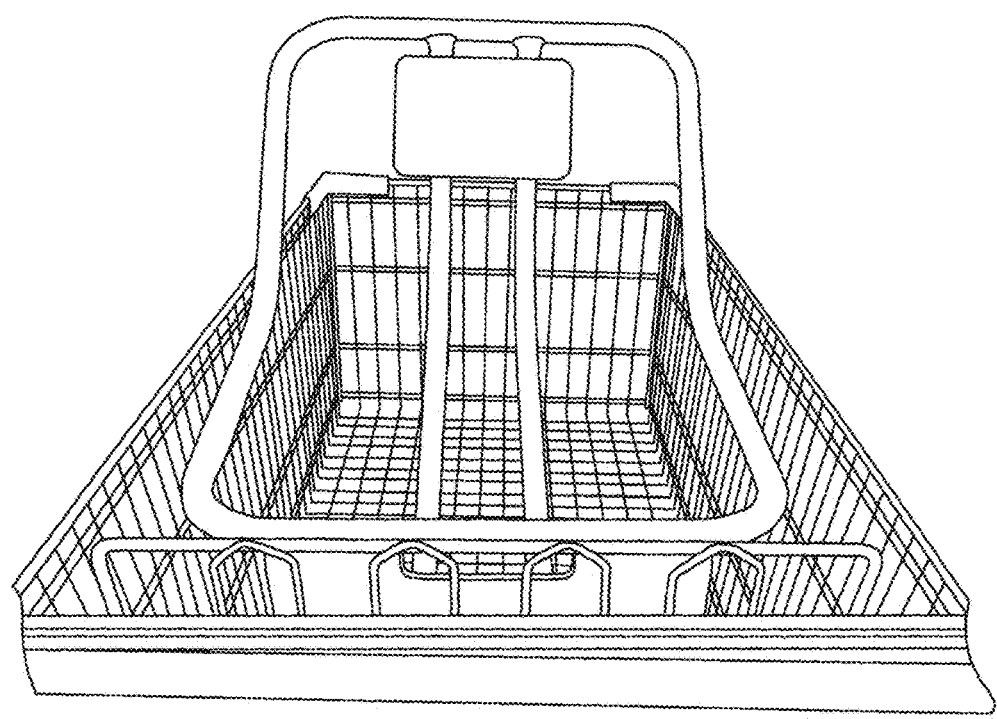

Referring to FIGS. 10-12, another exemplary embodiment of the infant carrier holder in accordance with the present disclosure is illustrated. The illustrated holder is formed out of tubular material that can be metal, such as aluminum or stainless steel, or other materials including plastics and composites of fiber and polymers, or any other material suitable for providing the desired strength and durability for supporting an infant carrier in harsh environments, such as is discussed above.

The illustrated holder is similar in function to holder 500, as being mounted on a gate of a shopping cart to pivot upward with the gate in a nesting action. The illustrated holder is also scoop-shaped, or concave, to permit sequential shopping carts with the holder mounted thereon to have clearance for a pivoting action when the gate to which the holder is mounted pivots upward in a nesting action. In addition, the shape permits the holder to be urged upward, for example by the handle of a shopping cart into which the shopping cart/holder combination is being nested. The concave shape of the holder provides a front edge that is generally higher than the handle of a shopping cart into which the holder/shopping cart combination is being nested when the holder is mounted to the gate of the shopping cart. With this shape, size and position, the holder is able to pivot with the gate in a nesting action, as well as urge the gate to pivot when being nested, and can swing upward with the gate without interference or interfering with other shopping carts or holders mounted thereto.

The holder illustrated in FIGS. 10-12 includes support members that extend from a front to a back of the holder near a centerline of the holder. These support members provide support for the infant holder, as illustrated in FIG. 11, near a centerline of the infant holder. Accordingly, the illustrated holder does not depend on ramps to stabilize the infant carrier, but rather a stabilizing centerline support that fits infant carriers in general. For example, infant carriers often have two curved supports at a lower portion to support the infant carrier being placed on a surface, such as a table or floor, while permitting the infant carrier to be rocked on the curved supports. The curved supports are typically implemented as runners, such as might be found on a rocking chair, with a gap in between. The support members of the illustrated holder support the infant carrier in the gap between the curved supports to provide a secure and stable mounting for the infant carrier.

In addition, the outer frame of the illustrated holder acts to stabilize the infant carrier while being supported by the support members. The outer frame tends to retain the infant carrier in a position on the support members, and thus on the holder, to enhance the stability and support for the infant carrier. The size and shape of the outer frame also helps to urge the infant carrier towards the gate, or rear, of the shopping cart to provide additional stabilization, as illustrated in FIG. 11. By urging the infant carrier into contact with the gate or outer frame of the holder that is adjacent the gate, the holder contributes to the positioning of the infant carrier in a stable and secure location. This location is supported by the support members and their generally concave shape, and the gate of the shopping cart, as well as by the outer frame of the holder. As with the other exemplary embodiments discussed above, the illustrated holder can be provided with straps, buckle segments and/or adjusters to secure the infant carrier to the holder. Any suitable type of securing mechanism can be used, including those mentioned above, to secure the infant carrier to the holder.

The foregoing description has been directed to particular embodiments of the present disclosure. It will be apparent, however, that other variations and modifications may be made to the described embodiments, with the attainment of some or all of their advantages. For example, the an embodiment may be implemented where the infant carrier holder is integral with the shopping cart. The appended claims are intended to cover all such variations and modifications as come within the true spirit and scope of the disclosed invention.

What is claimed is:

1. An infant carrier holder for supporting a handheld infant carrier on a shopping cart with a gate that includes a top extent and being pivotable to receive another shopping cart in a nesting operation, comprising:
    a support member with a first end and a second end opposing each other;
    two sidewalls arranged near opposing edges of the support member and extending from near the first end to near the second end;
    a mounting surface arranged at the first end of the support member and being planar and being configured to rigidly mount the infant carrier holder in a fixed position on the gate of the shopping cart;
    the mounting surface including a lower end adjoining the first end of the support member and an upper end being distal from the first end, the first end of the support member and the lower end of the mounting surface being below the top extent of the gate when the infant carrier holder is mounted to the gate when the gate is in a lowered position; and
    the support member extending away from a plane of the mounting surface and including an upper surface being continuously concavely curved from the first end to closely adjacent to the second end.

2. The infant carrier holder according to claim 1, wherein the planar mounting surface is configured and arranged to permit rigid mounting of the infant carrier holder to the gate of the shopping cart at a predetermined angle.

3. The infant carrier holder according to claim 2, further comprising the support member extending in an upward direction away from the gate of the shopping cart, such that an infant carrier placed atop the support member is urged toward the gate.

4. The infant carrier holder according to claim 2, wherein the mounting surface is coupled to the gate of the shopping cart at a maximum height of the gate that is sufficient for mounting the infant carrier holder.

5. The infant carrier holder according to claim 1, further comprising at least one ramp protruding from the support member for contributing to supporting an overlaid infant carrier in a stable position.

6. The infant carrier holder according to claim 5, further comprising the at least one ramp being concavely curved on an upper surface.

7. The infant carrier holder according to claim 1, further comprising the two sidewalls being separated by a dimension sufficient to permit the handheld infant carrier to contact the support member when the handheld infant carrier is placed atop the infant carrier holder.

8. The infant carrier holder according to claim 1, further comprising a top edge of the two sidewalls that is convexly curved.

9. The infant carrier holder according to claim 1, further comprising an end sidewall that is directly adjacent to the gate of the shopping cart when the infant carrier holder is mounted to the shopping cart.

10. The infant carrier holder according to claim 1, further comprising a height of the two sidewalls above the support member being sufficiently small to permit at least a portion of the handheld infant carrier to project over at least one of the two sidewalls when a bottom of the infant carrier is supported by the support member.

11. The infant carrier holder according to claim 1, further comprising a securing device coupled to at least one sidewall and configured to secure the handheld infant carrier in the infant carrier holder.

12. The infant carrier holder according to claim 1, wherein the infant carrier holder is integral with at least a portion of the shopping cart.

13. The infant carrier holder according to claim 1, wherein the first end is immediately adjacent to the gate.

* * * * *